United States Patent [19]

Murray

[11] Patent Number: 4,938,028
[45] Date of Patent: Jul. 3, 1990

[54] REFRIGERANT SOLUTION FLOW CONTROL

[75] Inventor: Joseph G. Murray, Worthington, Ohio

[73] Assignee: Gas Research Institute, Chicago, Ill.

[21] Appl. No.: 331,676

[22] Filed: Mar. 30, 1989

[51] Int. Cl.$^5$ .............................................. F25B 15/00
[52] U.S. Cl. ........................................ 62/108; 62/476; 62/487
[58] Field of Search .................. 62/108, 476, 487, 504

[56] References Cited

U.S. PATENT DOCUMENTS 1,873,435  8/1932  Lenning ............................ 62/487 X
2,610,482  9/1952  Berry ................................ 62/108 X Primary Examiner—Lloyd L. King
Attorney, Agent, or Firm—Watkins, Dunbar & Pollick

[57] ABSTRACT

A refrigeration fluid flow control device for application to absorption refrigeration systems for either cooling or heating air is comprised of an inverted, generally U-shaped, dripper tube having a non-siphon bend which joins on inlet leg and an outlet leg. The inlet leg projects into a refrigeration liquid pool; the outlet leg directs liquid flowed by pumping and surface tension effects, and not by a siphon effect, to the active heat transfer surface of an absorption refrigeration system absorber, evaporator, or desorber assembly.

3 Claims, 1 Drawing Sheet

REFRIGERANT SOLUTION FLOW CONTROL

FIELD OF THE INVENTION

This invention relates generally to refrigeration systems utilizing an absorption refrigeration cycle, and particularly concerns apparatus and methods for the improved control of the flow of liquid refrigerant or concentrated refrigerant solution to a system evaporator, absorber, or desorber for effecting refrigerant evaporation, absorption, or desorption.

CROSS REFERENCES

This Application is co-pending with patent application Ser. Nos. 07/331,671 and 07/331,675, also filed Mar. 30, 1989 and assigned to the assignee of the Application.

BACKGROUND OF THE INVENTION

Drippers are a well-known form of flow control device used in LiBr/H$_2$O absorption refrigeration units. Such devices are typically an inverted capillary tube which depends on a siphon effect to move a flow of liquid refrigerant or concentrated refrigerant solution over or through a cooperating header wall that otherwise retains the refrigeration fluid in a reservoir pool. Once initiated, the capillary flow remains continuous and constant so long as the siphon pressure differential exists. Because the fluid flow associated with absorption refrigeration system evaporator/absorber operation are often comparatively low and therefore require small diameter capillary devices, the presence of foreign matter or debris in the refrigeration fluid often results in dripper device flow blockage and a degradation of performance of the system including the dripper devices.

I have discovered that the prior art dripper device shortcomings can be overcome by the practice of my invention wherein use of a siphon effect is avoided when controlling the flow of absorption refrigeration fluids to system components for evaporation or absorption. The present invention is particularly advantageous for residential air cooling and heating applications utilizing an absorption refrigeration effect.

SUMMARY OF THE INVENTION

The present invention relates to the type of absorption refrigeration system detailed in the above Cross-References co-pending patent applications, and basically utilizes an inverted, generally U-shaped, non-siphon dripper tube to transfer absorption refrigeration fluid from a fluid pool within a header assembly, through a header wall creating the fluid pool, and to an interior or exterior heat transfer surface of a evaporator or absorber heat transfer tube member. The improved dripper tube preferably has an inlet opening with a vertical inlet face positioned below the cooperating header wall opening and depends primarily on fluid surface tension effects to initiate and maintain the desired flow and not on a siphon pressure differential effect. Accordingly, a larger internal diameter dripper tube may be used and tube blockage by included debris may be avoided.

The foregoing and other advantages of the invention will become apparent from the following disclosure in which a preferred embodiment of the invention is described in detail and illustrated in the accompanying drawings. It is contemplated that variations in structural features and arrangement of parts may appear to the person skilled in the art, without departing from the scope or sacrificing any of the advantages of the invention.

DETAILED DESCRIPTION OF THE INVENTION

Figure 1:
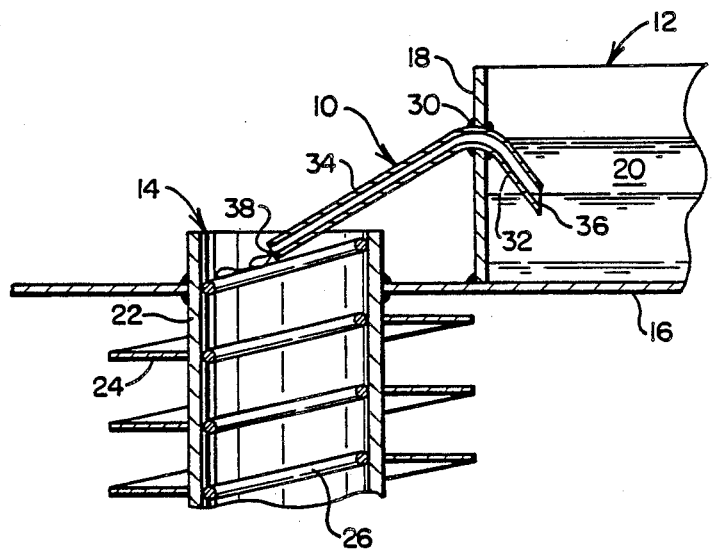
FIG. 1 is a schematic elevational and sectional view of a preferred embodiment of the improved dripper tube of this invention as combined with a conventional absorption refrigeration liquid header and with an evaporator/absorber heat transfer tube member.
Figure 2:
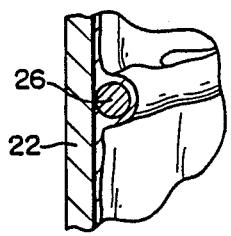
FIG. 2 is an enlarged portion of FIG. 1.

In the FIG. 1 illustration, dripper tube element 10 in accordance with this invention cooperates with fluid header 12 and with evaporator/absorber heat transfer tube member 14. Header 12 has a floor 16 and a vertical wall 18 that partially confine the flow of absorption refrigeration fluid 20 which typically is either liquid refrigerant (H$_2$O) or a concentrated refrigerant solution (LiBr/H$_2$O). For one particular utilization of the dripper tube refrigeration liquid flow control means of this invention refer to the specification of each of the above-identified co-pending patent applications and particularly FIGS. 10 and 10A thereof. Tube assembly 14, in the configuration of FIG. 1, has a straight walled vertical tube member 22 with affixed heat transfer fin 24 and a spring-like helical fluid distribution means which contacts an interior heat transfer surface of tube member 22 along a helical line of contact. FIG. 2 is an enlarged portion of FIG. 1 illustrating the flow of a thin film of refrigeration liquid over the face of the tube member 22 interior heat transfer surface and the formation of menisci above and below the line of contact between that heat transfer surface and fluid distribution coil means 26.

Dripper tube 10 in the FIG. 1 embodiment is formed basically with a right-angled bend 30 that joins inlet leg 32 to outlet leg 34 and that cooperates with an opening in header wall 18 in an exterior sealed relation. Inlet leg 32 has a vertical inlet opening face 36 which is positioned below the opening in wall 18; outlet leg 34 has outlet opening 38 which is located at the interior heat transfer surface of tube member 24 and preferably in proximity to fluid distribution coil means 26. The upper surface of fluid pool 20 is normally just above the elevation of the dripper tube lower interior surface at bend 30 when fluid flow through tube 10 is initialized. Surface tension effects of the liquid in pool 20 maintains fluid flow through tube 10 even though the upper surface of pool 20 subsequently drops moderately. Flow of fluid into pool 20 from the system condensers and desorber is normally not at a sufficiently high rate to cause dripper tube 10 to create a siphon effect.

In one embodiment of this invention for application in a residential absorption refrigeration system, dripper 10 was constructed of a ⅜" O.D. tube having a 0.021" wall thickness. Straight outlet leg 34 was approximately 2" long; the straight tube portion of inlet leg 32 tangent to bend 30 was approximately 1". (Bend inside diameter was approximately ⅜").

It has been understood that although the present invention has been specifically disclosed with the preferred embodiments and examples, modifications and variations of the concepts herein disclosed may be resorted to by those skilled in the art. Such modifications and variations, for example flattening the sensor tip or altering the sensing element geometry, are considered to be within the scope of the invention and the appended claims.

I claim:

1. In an absorption refrigeration system having header means that retains a pool of refrigeration liquid and heat transfer surface means that receives a flow of refrigeration liquid from the pool, in combination, inverted, generally U-shaped dripper tube means comprising:
   (a.) a non-siphon tube bend cooperating with an opening in the header wall at the level of the upper surface of the refrigeration liquid pool;
   (b.) a tube inlet leg joined to said tube and projected into the refrigeration liquid pool below the pool upper surface; and
   (c.) a tube outlet leg joined to said tube bend and having an outlet opening positioned at the evaporator/absorber heat surface transfer means to flow refrigeration liquid onto said surface means, said dripper tube means flowing refrigeration liquid from said liquid pool to said heat transfer surface means by pumping and surface tension effects and not by siphon pressure differential effect.

2. The invention defined by claim 1 wherein said dripper tube means inlet leg has an opening face, said opening face being oriented vertically.

3. In an absorption refrigeration system operating method of initiating through a tube means a flow of refrigeration liquid from a header means liquid pool to heat transfer surface, the steps of:
   (a.) flowing refrigeration liquid upwardly through a tube means inlet leg to a tube means bend;
   (b.) flowing refrigeration liquid essentially horizontally through said tube means bend by liquid surface level and surface tension effect; and
   (c.) flowing the fluid flow through said tube means bend downwardly through a tube means outlet leg to said heat transfer surface by gravitational force and surface tension effect.

* * * * *